United States Patent
Yoshinari et al.

(10) Patent No.: US 10,574,215 B2
(45) Date of Patent: Feb. 25, 2020

(54) RANDOM NUMBER GENERATOR, RANDOM NUMBER GENERATION DEVICE, NEUROMORPHIC COMPUTER, AND QUANTUM COMPUTER

(71) Applicant: TDK CORPORATION, Tokyo (JP)

(72) Inventors: Jiro Yoshinari, Tokyo (JP); Tomoyuki Sasaki, Tokyo (JP); Yohei Shiokawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/414,838

(22) Filed: May 17, 2019

(65) Prior Publication Data

US 2019/0305763 A1 Oct. 3, 2019

Related U.S. Application Data

(62) Division of application No. 15/891,759, filed on Feb. 8, 2018, now Pat. No. 10,340,901.

(30) Foreign Application Priority Data

Mar. 1, 2017 (JP) .................. 2017-038557
Dec. 19, 2017 (JP) .................. 2017-243274

(51) Int. Cl.
*G11C 11/06* (2006.01)
*G11C 11/00* (2006.01)
(Continued)

(52) U.S. Cl.
CPC .............. *H03K 3/84* (2013.01); *G06F 7/588* (2013.01); *H01F 10/329* (2013.01);
(Continued)

(58) Field of Classification Search
CPC combination set(s) only.
See application file for complete search history.

(56) References Cited

U.S. PATENT DOCUMENTS 9,691,458 B2   6/2017   Ralph et al.
9,824,735 B1   11/2017   Kan et al.
(Continued)

FOREIGN PATENT DOCUMENTS

JP   2003-108364 A   4/2003
JP   2004-030071 A   1/2004
(Continued)

OTHER PUBLICATIONS

Uchida et al. "Silicon single-electron tunneling device fabricated in an undulated ultrathin silicon-on-insulator film." Journal of Applied Physics, Oct. 2001, vol. 90, pp. 3551-3557.
(Continued)

*Primary Examiner* — An T Luu
(74) *Attorney, Agent, or Firm* — Oliff PLC

(57) ABSTRACT

A random number generator capable of generating a natural random number using a spin-orbit torque (SOT) is provided. The random number generator includes a ferromagnetic metal layer and a spin-orbit torque wiring extending in a first direction crossing a lamination direction of the ferromagnetic metal layer and being joined to the ferromagnetic metal layer, wherein the direction of spins injected from the spin-orbit torque wiring into the ferromagnetic metal layer and an easy magnetization direction of the ferromagnetic metal layer intersect each other.

21 Claims, 7 Drawing Sheets

(51) Int. Cl.
  *H03K 3/84* (2006.01)
  *H01F 10/32* (2006.01)
  *H01L 43/08* (2006.01)
  *G06F 7/58* (2006.01)
  *H01L 43/04* (2006.01)
  *H04L 9/08* (2006.01)
  *H01L 27/22* (2006.01)
  *G06N 3/063* (2006.01)
  *G06N 10/00* (2019.01)

(52) U.S. Cl.
  CPC ......... *H01F 10/3286* (2013.01); *H01L 43/04* (2013.01); *H01L 43/08* (2013.01); *H04L 9/0852* (2013.01); *G06N 3/0635* (2013.01); *G06N 10/00* (2019.01); *H01F 10/3254* (2013.01); *H01L 27/22* (2013.01)

(56) References Cited

U.S. PATENT DOCUMENTS

| | | |
|---|---|---|
| 2010/0131578 A1 | 5/2010 | Fukushima et al. |
| 2017/0178705 A1 | 6/2017 | Buhrman et al. |

FOREIGN PATENT DOCUMENTS

| | | |
|---|---|---|
| JP | 2005-018500 A | 1/2005 |
| JP | 2008-310403 A | 12/2008 |

OTHER PUBLICATIONS

Miron et al. "Perpendicular switching of a single ferromagnetic layer induced by in-plane current injection." Nature, Aug. 2011, vol. 476, pp. 189-194.

Sep. 6, 2018 Office Action issued in U.S. Appl. No. 15/891,759.

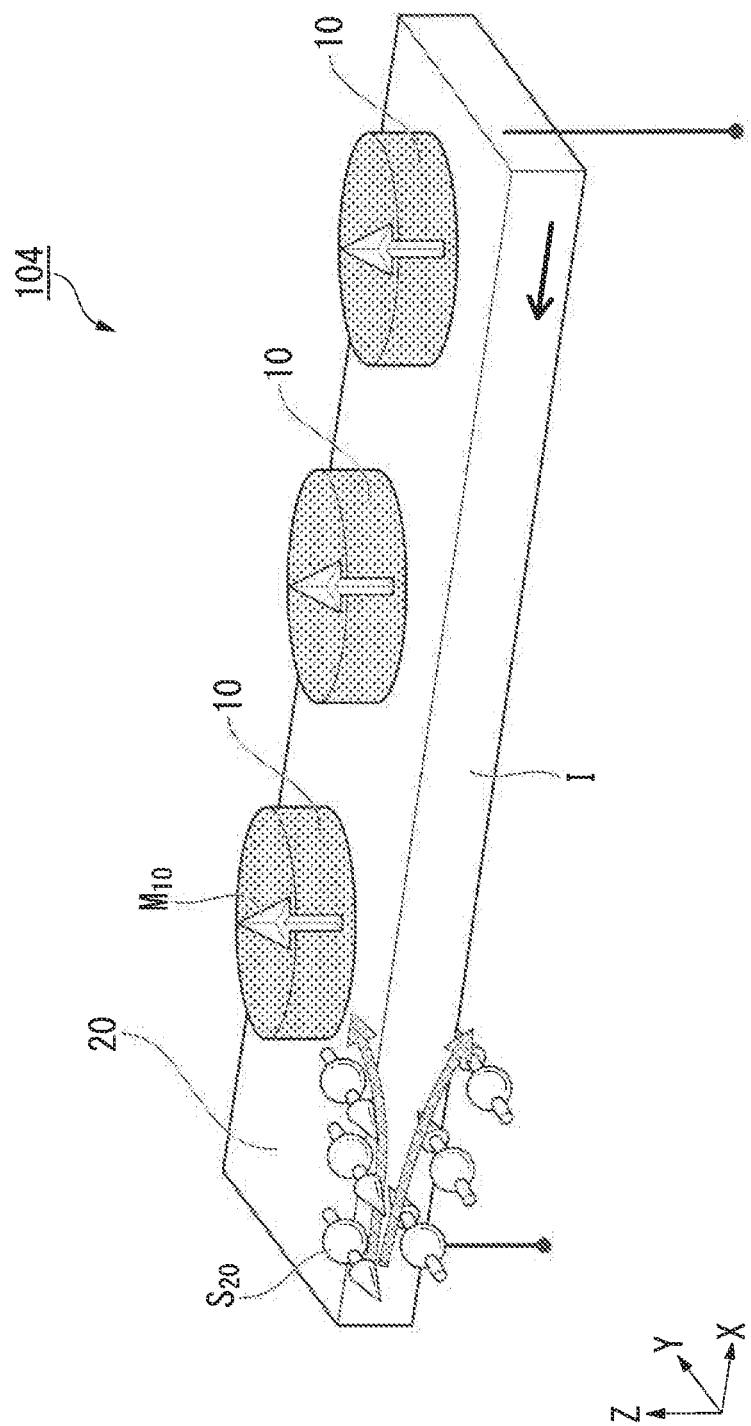

RANDOM NUMBER GENERATOR, RANDOM NUMBER GENERATION DEVICE, NEUROMORPHIC COMPUTER, AND QUANTUM COMPUTER

CROSS-REFERENCE TO RELATED APPLICATIONS

This is a Division of application Ser. No. 15/891,759, filed Feb. 8, 2018, which claims the benefit of Japanese Patent Application No. 2017-038557, filed Mar. 1, 2017 and Japanese Patent Application No. 2017-243274, filed Dec. 19, 2017. The disclosure of the prior applications is hereby incorporated by reference herein in its entirety.

BACKGROUND OF THE INVENTION

Field of the Invention

The present invention relates to a random number generator, a random number generation device, a neuromorphic computer, and a quantum computer.

Priority is claimed on: Japanese Patent Application No. 2017-038557 filed on Mar. 1, 2017; and Japanese Patent Application No. 2017-243274 filed on Dec. 19, 2017, the contents of which are incorporated herein by reference.

Description of Related Art

Random numbers include pseudorandom numbers and natural random numbers. Pseudorandom numbers are random numbers obtained using a computer according to a predetermined program. Pseudorandom numbers have a problem that the program outputs the same result when the same initial values are input to the program, a problem that the random numbers have a specific periodicity based on the number of registers of the computer, and the like. On the other hand, natural random numbers are random numbers obtained from stochastic events occurring in nature and there is no doubt that the numbers are random.

Known means for obtaining a natural random number include a random number generator which uses noise (the sum of thermal noise and shot noise) of a tunnel junction (Japanese Unexamined Patent Application, First Publication No. 2003-108364), a random number generator which uses thermal noise amplified by a single electron transistor effect (Japanese Unexamined Patent Application, First Publication No. 2004-30071), a random number generator which uses thermal noise amplified by a negative resistance element (Japanese Unexamined Patent Application, First Publication No. 2005-18500), a random number generator which uses oscillations of a magnetization free layer due to approximate fields of a magnetoresistance effect element (Japanese Unexamined Patent Application, First Publication No. 2008-310403), and a random number generator which uses capture and emission of electrons in a very thin silicon-on-insulator (SOI) transistor (K. Uchida et al., J. Appl. Phys. No. 90, (2001), pp 3551.), and the like.

SUMMARY OF THE INVENTION

However, the random number generators, which are described in Japanese Unexamined Patent Application, First Publication No. 2003-108364; Japanese Unexamined Patent Application, First Publication No. 2004-30071; and Japanese Unexamined Patent Application, First Publication No. 2005-18500, need an amplifier circuit for amplifying noise and a threshold circuit for binarizing information and thus the size of the random number generator is increased. In the random number generator described in K. Uchida et al., J. Appl. Phys. No. 90, (2001), pp 3551, the random number generation speed is 100 kbit/sec but it is difficult for the random number generator to operate to satisfy this operation speed.

The random number generator described in Japanese Unexamined Patent Application, First Publication No. 2008-310403 generates a random number using a spin transfer torque (STT) generated by causing a current to flow in the laminating direction of the magnetoresistance effect element. However, this random number generator has a small margin of the current and magnetic field applied to obtain a random number and is likely to be influenced by external factors.

The present invention has been made in view of the above problems and it is an object of the present invention to provide a random number generator which can generate a natural random number using a spin-orbit torque (SOT).

In recent years, attention has been focused on magnetization reversal utilizing a pure spin current generated by spin-orbit interaction as means for reducing the reversal current (for example, I. M. Miron, K. Garello, G. Gaudin, P.-J. Zermatten, M. V. Costache, S. Auffret, S. Bandiera, B. Rodmacq, A. Schuhl, and P. Gambardella, Nature, 476, 189 (2011).). As a result of intensive studies, the present inventors have created a new random number generator utilizing the spin-orbit torque (SOT) generated by this spin-orbit interaction.

(1) A random number generator according to a first aspect includes a ferromagnetic metal layer and a spin-orbit torque wiring extending in a first direction intersecting a lamination direction of the ferromagnetic metal layer and being joined to the ferromagnetic metal layer, wherein a direction of spin injected from the spin-orbit torque wiring into the ferromagnetic metal layer and an easy magnetization direction of the ferromagnetic metal layer intersect each other.

(2) In the random number generator according to the first aspect, the direction of the spin injected from the spin-orbit torque wiring into the ferromagnetic metal layer and the easy magnetization direction of the ferromagnetic metal layer may be inclined at 45 degrees or more and 90 degrees or less with respect to each other.

(3) In the random number generator according to the first aspect, the direction of the spin injected from the spin-orbit torque wiring into the ferromagnetic metal layer and the easy magnetization direction of the ferromagnetic metal layer may be orthogonal to each other.

(4) In the random number generator according to the first aspect, a plurality of the ferromagnetic metal layers may be joined to the spin-orbit torque wiring.

(5) In the random number generator according to the first aspect, a nonmagnetic layer and a second ferromagnetic metal layer may be provided in order on a surface of the ferromagnetic metal layer opposite to the spin-orbit torque wiring.

(6) The random number generator according to the first aspect may further include an external magnetic field applying part configured to apply a magnetic field to the ferromagnetic metal layer.

(7) The random number generator according to the first aspect may further include a magnetic shield sandwiching or surrounding the ferromagnetic metal layer and the spin-orbit torque wiring.

(8) A random number generation device according to a second aspect includes the random number generator according to the first aspect and a current applying part configured to apply a current to the spin-orbit torque wiring of the random number generator.

(9) A neuromorphic computer according to a third aspect includes the random number generator according to the first aspect.

(10) A quantum computer according to a fourth aspect includes the random number generator according to the first aspect.

The random number generator according to the above aspects can generate a natural random number using the spin-orbit torque (SOT).

BRIEF DESCRIPTION OF THE DRAWINGS

FIG. 12 is a perspective view schematically showing a random number generator according to a fourth embodiment.

DETAILED DESCRIPTION OF THE INVENTION

Figure 1:
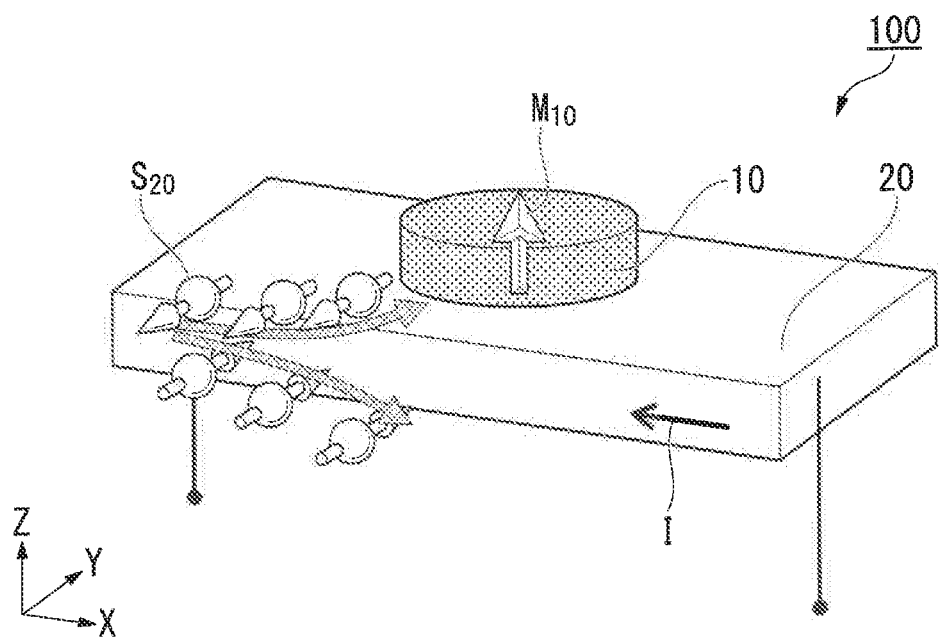
FIG. 1 is a perspective view schematically showing a random number generator according to a first embodiment.

Hereinafter, embodiments of the present invention will be described in detail with reference to the drawings as appropriate. In the drawings used in the following description, for the sake of clarity of the features of the present invention, sometimes the characteristic portions thereof are enlarged for the sake of convenience and the dimensional ratios of the constituent elements are different from actual ones. The materials, dimensions, and the like exemplified in the following description are examples, and the present invention is not limited thereto and can be carried out by making appropriate changes within a range in which the effects of the present invention are achieved.

[First Embodiment]
(Random Number Generation Device, Random Number Generator)

FIG. 1 is a perspective view schematically showing a random number generator according to a first embodiment. The random number generator 100 according to the first embodiment includes a ferromagnetic metal layer 10 and a spin-orbit torque wiring 20. The random number generator 100 functions as a random number generation device by connecting the random number generator 100 to a current applying part (not shown) which applies a current to the spin-orbit torque wiring 20.

In the following embodiments, the lamination direction of the ferromagnetic metal layer 10 is defined as a z direction, a first direction in which the spin-orbit torque wiring 20 extends as an x direction, and a second direction orthogonal to the z and x directions as a y direction.

<Ferromagnetic Metal Layer>

The ferromagnetic metal layer 10 has an easy magnetization direction and a hard magnetization direction. The easy magnetization direction is a direction in which the magnetization $M_{10}$ of the ferromagnetic metal layer 10 is most easily oriented and the hard magnetization direction is another direction. The ferromagnetic metal layer 10 may be either an in-plane magnetized film whose easy magnetization direction is an in-plane direction parallel to the layer or a perpendicular magnetization film whose magnetization direction is perpendicular to the layer. To reduce the area of the ferromagnetic metal layer 10 and to miniaturize the size of the random number generator 100, it is preferable that the ferromagnetic metal layer 10 is a perpendicular magnetization film.

The magnetization $M_{10}$ of the ferromagnetic metal layer 10 is oriented in the easy magnetization direction when no external force is applied. In FIG. 1, the magnetization $M_{10}$ is oriented in the direction perpendicular to the lamination surface of the ferromagnetic metal layer 10 (the z direction) in a state in which no external force is applied. That is, the ferromagnetic metal layer 10 shown in FIG. 1 is a perpendicular magnetization film whose easy magnetization direction is the z direction. The following description is based on this example.

A known material can be used for the ferromagnetic metal layer 10. For example, a metal selected from the group consisting of Cr, Mn, Co, Fe and Ni and an alloy containing at least one of these metals and exhibiting ferromagnetism can be used. An alloy containing these metals and at least one element of B, C, and N can also be used. Specific examples are Co—Fe and Co—Fe—B. Alternatively, a Heusler alloy or the like may be used.

<Spin-Orbit Torque Wiring>

The spin-orbit torque wiring 20 extends in the x direction. The spin-orbit torque wiring 20 is connected to one surface in the z direction of the ferromagnetic metal layer 10.

The spin-orbit torque wiring 20 supplies spins derived from a spin-orbit interaction to the ferromagnetic metal layer 10. Spins derived from the spin-orbit interaction are generated due to both the spin Hall effect caused by the current flowing through the spin-orbit torque wiring 20 and the interface Rashba effect between different element interfaces.

Figure 2:
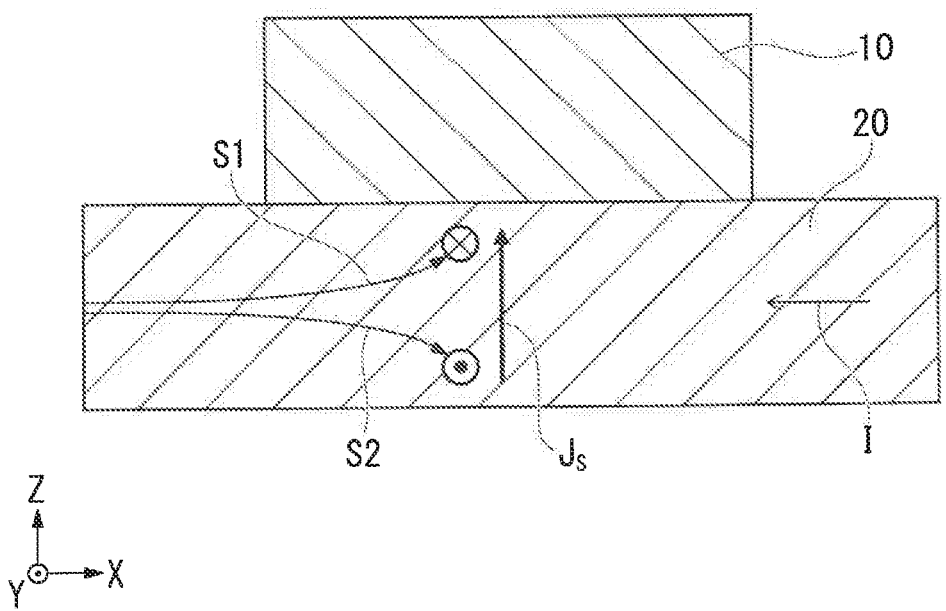
FIG. 2 is a schematic diagram illustrating the spin Hall effect.

First, the spin Hall effect will be described. The spin Hall effect is a phenomenon in which when a current flows through a material, a pure spin current is induced in a direction orthogonal to the direction of the current due to the spin-orbit interaction. FIG. 2 is a schematic diagram illustrating the spin Hall effect. FIG. 2 is a cross-sectional view of the random number generator 100 shown in FIG. 1 cut in the x direction. The mechanism by which a pure spin current is generated due to the spin Hall effect will now be described with reference to FIG. 2.

As shown in FIG. 2, when a current I is caused to flow in the extending direction of the spin-orbit torque wiring 20, a first spin S1 oriented in a direction into the plane of the figure and a second spin S2 oriented in a direction out of the plane of the figure are each orthogonal to the direction of the current. The usual and spin Hall effects are common in that moving (translating) electric charge (electrons) curves their direction of movement (translation). The significant difference is that the usual Hall effect is that charged particles moving in a magnetic field experience the Lorentz force, thus curving their movement direction, whereas the spin Hall effect is that they curve the movement direction only due to movement of electrons (i.e., only due to a flow of current) without presence of magnetic fields.

In a nonmagnetic material (i.e., in a non-ferromagnetic material), the number of electrons with the first spin S1 is equal to the number of electrons with the second spin S2. Therefore, the number of electrons with the first spin S moving upward and the number of electrons with the second spin S2 moving downward are equal in the figure. When the flow of electrons with the first spin S1 is $J_\uparrow$, the flow of electrons with the second spin S2 is $J_\downarrow$, and the spin current is $J_S$, the spin current is defined such that $J_S=J_\uparrow-J_\downarrow$. $J_S$ is a flow of electrons with polarizability of 100%. That is, in the spin-orbit torque wiring 20, the current that is a net flow of charge is zero and this spin current without electric current is particularly called a pure spin flow.

When the ferromagnetic metal layer 10 is joined to the spin-orbit torque wiring 20 in which the pure spin current is generated, the first spins S1 going upward in FIG. 2 diffuse and flow into the ferromagnetic metal layer 10.

Next, the interface Rashba effect will be described. The interface Rashba effect is a phenomenon in which spins tend to be oriented in a specific direction under the influence of an interface between different elements and spins oriented in the specific direction are accumulated in the vicinity of the interface.

For example, in FIG. 2, the interface between the ferromagnetic metal layer 10 and the spin-orbit torque wiring 20 is an interface between different elements. Therefore, spins oriented in a specific direction are accumulated on a surface of the spin-orbit torque wiring 20 adjacent to the ferromagnetic metal layer 10. The accumulated spins diffuse and flow into the ferromagnetic metal layer 10 in order to achieve energy stability.

The spin-orbit torque wiring 20 may have a portion (a spin generating portion) made of a material from which spins are generated and a portion made of a material from which no spins are generated.

Figure 3:
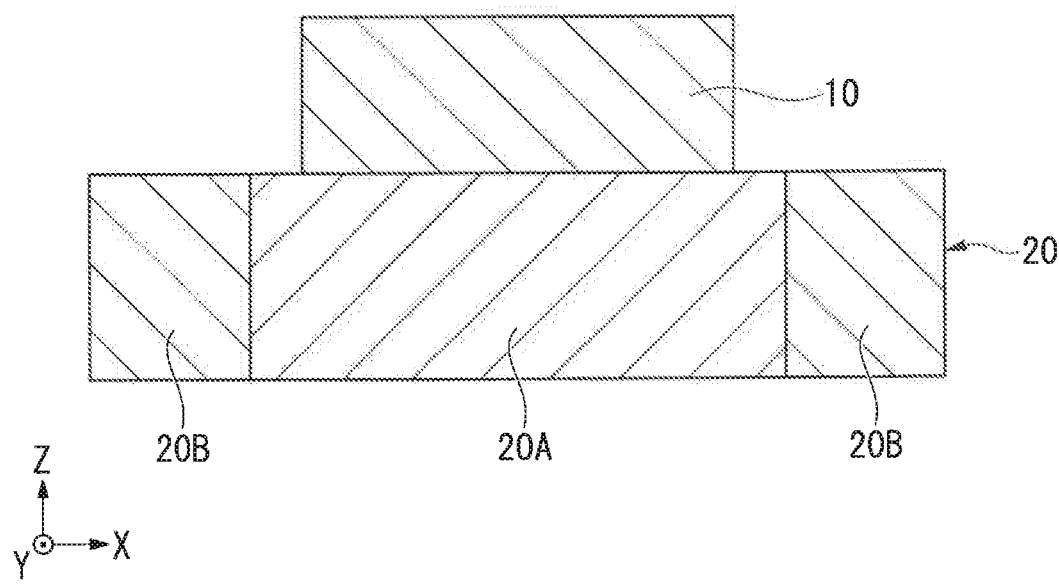
FIG. 3 is a cross-sectional view of an example of the random number generator according to the first embodiment.

FIG. 3 is a cross-sectional view of an example of the random number generator according to the first embodiment. A spin-orbit torque wiring 20 shown in FIG. 3 has a spin generating portion 20A and low resistance portions 20B which are arranged in the extending direction (x direction) of the spin-orbit torque wiring 20.

The spin generating portion 20A needs to generate spins to be injected into the ferromagnetic metal layer 10 and thus the material of the spin generating portion 20A is limited. Therefore, the spin generating portion 20A often has a high wiring resistance. By providing low resistance portions 20B, it is possible to lower the resistance of the entire spin-orbit torque wiring 20. Highly conductive Al, Cu, Ag, or the like can be used as the low resistance portions 20B.

Figure 4:
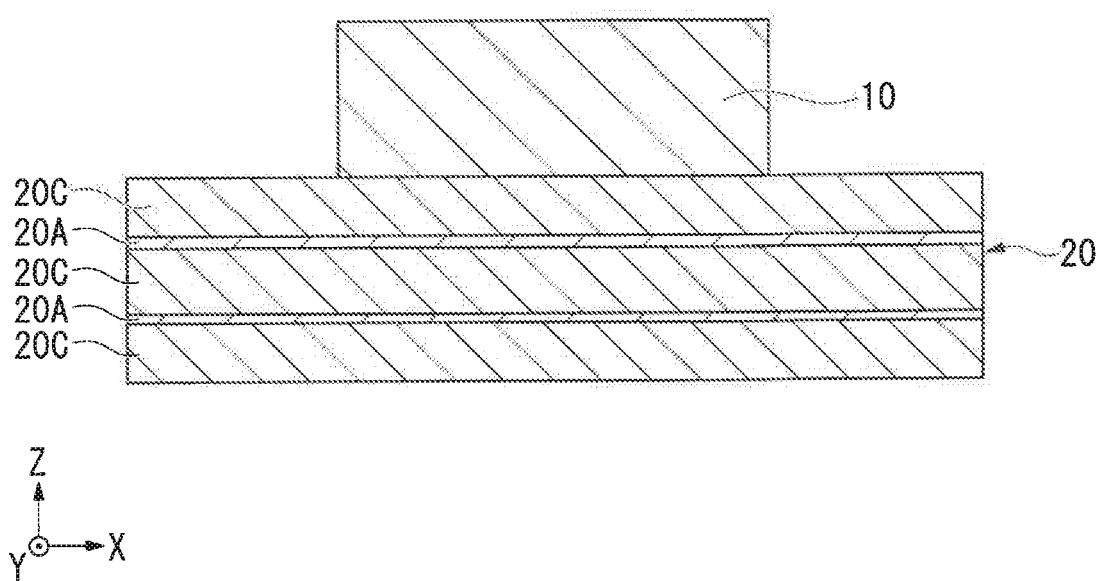
FIG. 4 is a cross-sectional view of another example of the random number generator according to the first embodiment.

On the other hand, FIG. 4 is a sectional view of another example of the random number generator according to the first embodiment. As shown in FIG. 4, a spin-orbit torque wiring 20 has spin generating portions 20A and spin conducting portions 20C which are arranged in the lamination direction (z direction) of the spin-orbit torque wiring 20.

Since the spin generating portions 20A and the spin conducting portions 20C form a laminated structure, the number of interfaces of different elements increases. As a result, spin injection into the ferromagnetic metal layer 10 using the interface Rashba effect can be performed more efficiently. Here, in order to transfer the accumulated spins to the ferromagnetic metal layer 10, it is preferable that a material having a long spin diffusion length be used for the spin conducting portions 20C. For example, Al, Si, Cu, Ag, GaAs, Ge, or the like can be used.

In any of the configurations of FIGS. 3 and 4, the spin generating portion 20A is made of a material that generates spins to be injected into the ferromagnetic metal layer 10. The material constituting the spin-orbit torque wiring 20 is not limited to a material including a single element.

The spin generating portion 20A may include a nonmagnetic heavy metal. Here, the term "heavy metal" is used to indicate a metal having a specific gravity equal to or higher than that of yttrium. The spin generating portion 20A may be made of only a nonmagnetic heavy metal.

It is preferable that the nonmagnetic heavy metal is a nonmagnetic metal having a high atomic number of 39 or more and having d or f electrons in the outermost shell. Nonmagnetic heavy metals have a great spin-orbit interaction that causes the spin Hall effect. The spin generating portion 20A may be made of only a nonmagnetic metal having a high atomic number of 39 or more and having d or f electrons in the outermost shell.

Normally, when a current is caused to flow through a metal, all electrons move in a direction opposite to the direction of the current regardless of the directions of spins. However, since the nonmagnetic metal having a high atomic number and having d or f electrons in the outermost shell has a great spin-orbit interaction, when a current is caused to flow through the nonmagnetic metal, the direction of movement of electrons depends on the directions of spins of electrons due to the spin Hall effect and a pure spin current $J_S$ tends to occur.

The spin generating portion 20A may also include a magnetic metal. "Magnetic metal" indicates a ferromagnetic metal or an antiferromagnetic metal. This is because inclusion of a small amount of a magnetic metal in the nonmagnetic metal increases the spin-orbit interaction and thus can increase the efficiency of spin current generation of the spin generating portion 20A. The spin generating portion 20A may also be made of only an antiferromagnetic metal.

The spin-orbit interaction is caused by an intrinsic internal field of the material constituting the spin generating portion 20A. If a trace amount of a magnetic metal is added to the material of the spin-orbit torque wiring, the efficiency of spin current generation is improved because the magnetic metal scatters electron spins flowing through the material. However, if the amount of the magnetic metal added is excessively increased, the added magnetic metal scatters the generated pure spin current, resulting in increasing the effect of decreasing the spin current. Therefore, it is preferable that the mole fraction of the added magnetic metal be sufficiently smaller than the mole fraction of the main element of the spin generating portion in the spin-orbit torque wiring. It is preferable that the mole fraction of the added magnetic metal be roughly 3% or less.

The spin generating portion 20A may also include a topological insulator. The spin generating portion 20A may be made of only a topological insulator. The topological insulator is a material which is internally an insulator or a high resistance body but is a spin-polarized metallic state on the surface thereof. Materials have an internal magnetic field or the like called a spin-orbit interaction. Therefore, even if there is no external magnetic field, a new topological phase arises in the material due to the effect of the spin-orbit interaction. This is a topological insulator which can generate a pure spin current with high efficiency due to a strong spin-orbit interaction and breaking of reversal symmetry at the edge.

The topological insulator is preferably, for example, SnTe, $Bi_{1.5}Sb_{0.5}Te_{1.7}Se_{1.3}$, $TlBiSe_2$, $Bi_2Te_3$, $(Bi_{1-x}Sb_x)_2Te_3$, or the like. These topological insulators are capable of generating a spin current with high efficiency.

The random number generator 100 may have components other than the ferromagnetic metal layer 10 and the spin-orbit torque wiring 20. For example, the random number generator 100 may have a substrate or the like as a supporting body. The substrate is preferably one with excellent flatness. For example, Si, AlTiC, or the like can be used as a material for the substrate.

<Operation of Random Number Generation Device>

When a current applying part causes a current to flow through the spin-orbit torque wiring 20, spins are accumulated and a pure spin current is generated due to the interface Rashba effect. The generated spins diffuse and flow into the ferromagnetic metal layer 10. That is, spins $S_{20}$ generated in the spin-orbit torque wiring 20 are injected into the ferromagnetic metal layer 10.

Figure 5:
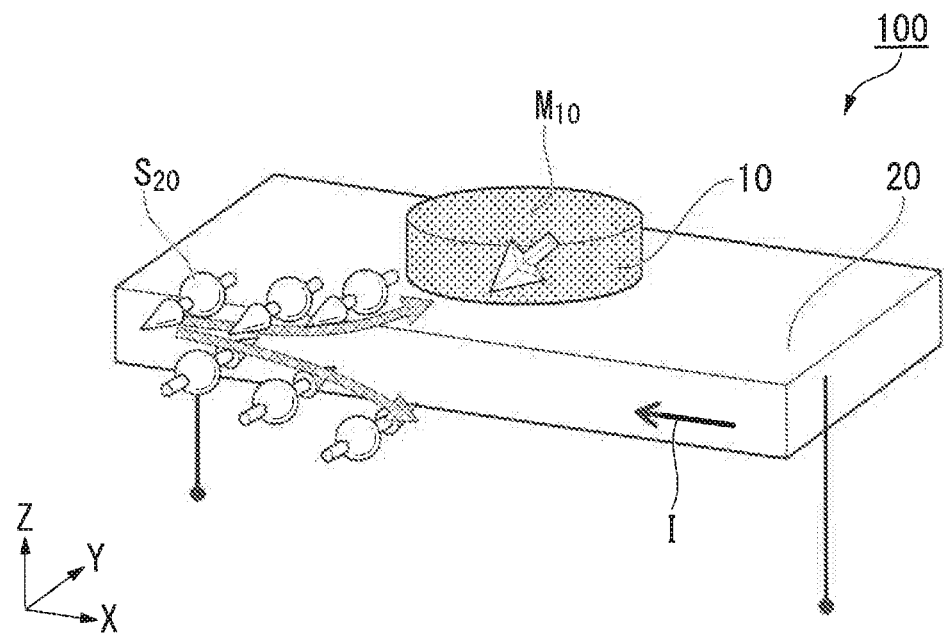
FIG. 5 is a perspective view schematically showing a state in which a current is applied to a spin-orbit torque wiring 20 of the random number generator 100 according to the first embodiment.

FIG. 5 is a perspective view schematically showing a state in which a current is applied to the spin-orbit torque wiring 20 of the random number generator 100 according to the present embodiment. The direction of the spins $S_{20}$ injected from the spin-orbit torque wiring 20 is orthogonal to a direction along which both terminals of the spin-orbit torque wiring 20 connected to the current applying part are located (which is the x direction).

As shown in FIG. 1, the direction of the injected spins $S_{20}$ is orthogonal to the direction of the magnetization $M_{10}$ of the ferromagnetic metal layer 10 (i.e., orthogonal to the easy magnetization direction thereof). Therefore, the magnetization $M_{10}$ of the ferromagnetic metal layer 10 is influenced by the injected spins $S_{20}$. The magnetization $M_{10}$ oriented in the z direction receives a torque in the y direction as if an external magnetic field were applied in the y direction.

The vector direction of the torque applied is orthogonal to the easy magnetization direction (i.e., orthogonal to the z direction in FIG. 1). Upon receiving this torque, the magnetization $M_{10}$ oriented in the easy magnetization direction (which is the z direction in FIG. 1) in an initial state is oriented in the hard magnetization direction (which is the −y direction in FIG. 5). This state is maintained as long as current continues to be applied to the spin-orbit torque wiring 20.

It is preferable that the current applied to the spin-orbit torque wiring 20 satisfy the following relational expression (1).

$$J \geq \frac{M_S t_F}{\theta_{SH}} \left( \frac{H_{K,eff}}{2} - \frac{H_x}{\sqrt{2}} \right) \times 10^7 \quad (1)$$

Here, $M_S$ is the saturation magnetization (emu/cm$^3$) of the ferromagnetic metal layer 10, $t_F$ is the film thickness (cm) of the ferromagnetic metal layer 10, $\theta_{SH}$ is the effective spin Hall angle of the spin-orbit torque wiring 20, $H_{K,eff}$ is the effective anisotropic magnetic field (Oe) of the ferromagnetic metal layer 10, and $H_x$ is the external magnetic field (Oe) applied in the current application direction of the spin-orbit torque wiring 20.

If a current satisfying the above relational expression (1) is applied to the spin-orbit torque wiring 20, a sufficient amount of spins $S_{20}$ can be supplied to the ferromagnetic metal layer 10 and thus the magnetization $M_{10}$ can stably maintain the hard magnetization direction (which is the −y direction in FIG. 5).

The vector direction of the torque which the magnetization $M_{10}$ receives due to the injected spins $S_{20}$ is the −y direction. Therefore, even if the amount of the applied current increases and thus the magnitude of the torque increases, the magnetization $M_{10}$ will not be reversed to the −z direction. It is to be noted that magnetization reversal elements or the like using the SOT apply an additional external force (external magnetic field or the like) to the magnetization which has been rotated to a hard magnetization direction to cause a magnetization reversal using the external force as a trigger, whereas the random number generator applies no additional external force such that the magnetization $M_{10}$ maintains the state in which it is oriented in the hard magnetization direction.

Figure 6:
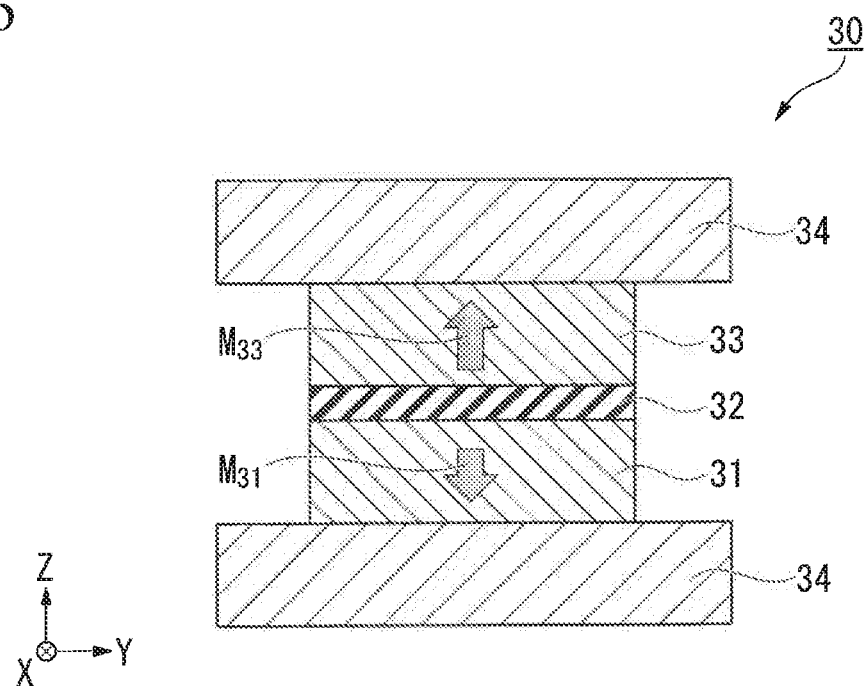
FIG. 6 is a schematic diagram illustrating the operation of a random number generator using STT.

On the other hand, it is difficult for the related-art random number generator using STT to adjust the direction of magnetization when current is applied. FIG. 6 is a schematic diagram illustrating the operation of the random number generator using STT. The random number generator 30 using STT shown in FIG. 6 has a free layer 31, a nonmagnetic layer 32, and a fixed layer 33 which are laminated in order, and two wirings 34 sandwiching these layers therebetween.

In the random number generator shown in FIG. 6, when a current is caused to flow between the two wirings 34, spins are injected from the fixed layer 33 into the free layer 31. The spins injected from the fixed layer 33 have the same +z direction as the magnetization $M_{33}$ of the fixed layer 33. Therefore, the magnetization $M_{31}$ of the free layer 31 receives a force in the +z direction. In the random number generator 101 using STT, the force in the +z direction is adjusted such that the direction of orientation of the magnetization $M_{31}$ when current is applied becomes the x direction or the y direction (which is a hard magnetization direction).

Thus, in the random number generator 30 using STT, the direction (x direction or y direction) in which the magnetization $M_{31}$ is desired to be oriented when current is applied does not coincide with the direction (+z direction) of the force applied to the magnetization $M_{31}$. Therefore, to keep the direction of the magnetization $M_{31}$ in the hard magnetization direction when current is applied, it is necessary to delicately adjust the amount of the current applied. Further, it is necessary to adjust the amount of the applied current each time an external factor such as heat is applied.

On the other hand, in the random number generator 100 using the SOT according to the present embodiment, the direction in which the magnetization $M_{10}$ is oriented when current is applied (−y direction) and the direction of the force applied to the magnetization $M_{10}$ (−y direction) coincide with each other as shown in FIG. 5. Therefore, it suffices to apply an amount of current exceeding a threshold value and thus it is unnecessary to perform delicate adjustment.

Next, the current applied to the spin-orbit torque wiring 20 of the random number generator 100 is stopped in order to generate a random number. When the current applied to the spin-orbit torque wiring 20 is stopped, spins $S_{20}$ are no longer injected into the ferromagnetic metal layer 10. That is, the force which causes the magnetization $M_{10}$ of the ferromagnetic metal layer 10 to be oriented in the −y direction is removed.

The magnetization $M_{10}$ is energetically stable when it is oriented in the easy magnetization direction (z direction). Therefore, the magnetization $M_{10}$ which has lost the force causing it to be oriented in the −y direction returns to the easy magnetization direction (z direction). Here, the magnetization $M_{10}$ becomes oriented in either the +z direction or the −z direction. Both the +z direction and the −z direction are equivalent with respect to the −y direction and the probability that the magnetization $M_{10}$ is oriented in the +z direction and the probability that it is oriented in the −z direction are both 50%. For this reason, for example, assuming that the case in which the magnetization $M_{10}$ is oriented in the +z direction is "1" and the case in which the magnetization $M_{10}$ is oriented in the −z direction is "0," a random number with the probabilities of occurrence of "1" and "0" being 50% is obtained.

When the current applied to the spin-orbit torque wiring 20 is increased to a value equal to or higher than the threshold current represented by the expression (1), a back hopping phenomenon occurs and the magnetization $M_{10}$ may deviate from the hard magnetization direction. However, even in this case, it is still possible to obtain a random number with the probabilities of occurrence of "1" and "0" being 50%. When the current applied to the spin-orbit torque wiring 20 is stopped, the magnetization $M_{10}$ returns to an easy magnetization direction (+z direction, −z direction) corresponding to its direction deviated due to the back hopping phenomenon. Since the deviation of the direction of the magnetization $M_{10}$ occurs randomly, the easy magnetization direction (+z direction, −z direction) to which the magnetization $M_{10}$ returns is also random and it is thus possible to obtain a random number with the probabilities of occurrence of "1" and "0" being 50%.

Figure 7:
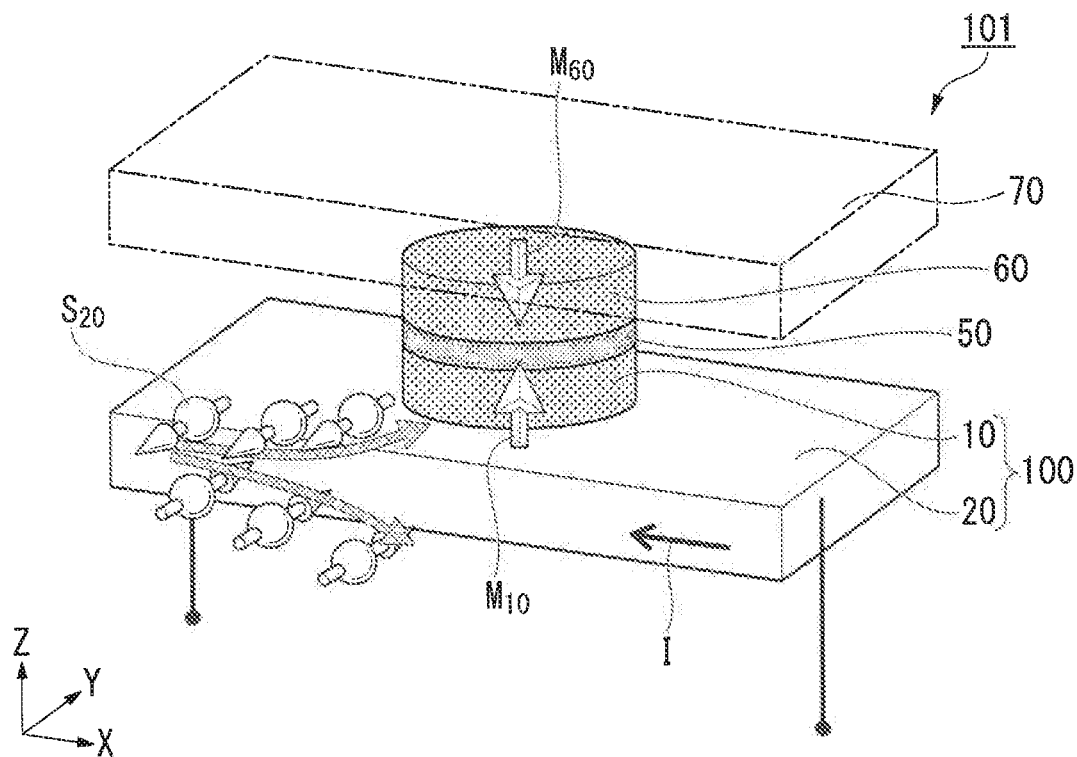
FIG. 7 is a schematic perspective view of a random number generator which can read a difference in the orientation state of magnetization through a resistance change.

Information regarding in which of the +z and −z directions the magnetization $M_{10}$ is oriented can be extracted by various means. For example, a difference in the orientation state of magnetization can be read through a resistance change. FIG. 7 is a schematic perspective view of a random number generator 101 which can read a difference in the orientation state of magnetization through a resistance change.

The random number generator 101 shown in FIG. 7 includes, in order, a nonmagnetic layer 50, a second ferromagnetic metal layer 60, and a wiring layer 70 on a side of the ferromagnetic metal layer 10 opposite to the spin-orbit torque wiring 20.

The random number generator 101 reads a magnetization state of the ferromagnetic metal layer 10 by measuring the resistance between the spin-orbit torque wiring 20 and the wiring layer 70. The resistance is low when the direction of the magnetization $M_{10}$ of the ferromagnetic metal layer 10 is parallel to the direction of the magnetization $M_{60}$ of the second ferromagnetic metal layer 60 (which is the −z direction) (i.e., when the direction of the magnetization $M_{10}$ is the −z direction) and is high when the direction of the magnetization $M_{10}$ is antiparallel thereto (i.e., when the direction of the magnetization $M_{10}$ is the +z direction).

A known material can be used for the nonmagnetic layer 50. When the nonmagnetic layer 50 is an insulator, the ferromagnetic metal layer 10, the nonmagnetic layer 50, and the second ferromagnetic metal layer 60 form a TMR element. When the nonmagnetic layer 50 is a metal, the ferromagnetic metal layer 10, the nonmagnetic layer 50, and the second ferromagnetic metal layer 60 form a GMR element. In order to more clearly obtain a difference in the direction of orientation of the magnetization $M_{10}$, it is preferable to form a TMR element which can obtain a great change in magnetoresistance.

For example, when the nonmagnetic layer 50 is made of an insulator (i.e., when the nonmagnetic layer 50 is a tunnel barrier layer), $Al_2O_3$, $SiO_2$, MgO, $MgAl_2O_4$, or the like can be used as a material for the nonmagnetic layer 50. Besides these materials, a material in which a part of Al, Si, or Mg is substituted with Zn, Be, or the like can also be used for the nonmagnetic layer 50. Among them, MgO and $MgAl_2O_4$ can efficiently inject spins since these are materials capable of realizing coherent tunneling.

When the nonmagnetic layer 50 is made of a metal, Cu, Au, Ag, or the like can be used as a material for the nonmagnetic layer 50.

When the nonmagnetic layer 50 is made of an insulator (i.e., when the nonmagnetic layer 50 is a tunnel barrier layer), it is preferable that the thickness of the tunnel barrier layer is 2 nm or more. When the film thickness of the tunnel barrier layer is 2 nm or more, the amount of change in magnetoresistance increases. Therefore, it is possible to reduce the amount of current which is applied between the spin-orbit torque wiring 20 and the wiring layer 70 in order to check the orientation state of the magnetization $M_{10}$ of the ferromagnetic metal layer 10, and thus heat generation of the random number generator 101 is also suppressed. As a result, a random number generator with high stability is obtained.

The second ferromagnetic metal layer 60 is a fixed layer of which the magnetic anisotropy is relatively stronger than that of the ferromagnetic metal layer 10 and the magnetization direction is fixed in one direction.

A known material can be used for the second ferromagnetic metal layer 60. For example, a metal selected from the group consisting of Cr, Mn, Co, Fe and Ni and an alloy containing at least one of these metals and exhibiting ferromagnetism can be used. An alloy containing these metals and at least one element of B, C, and N can also be used. Specific examples are Co—Fe and Co—Fe—B. Alternatively, a Heusler alloy or the like may be used.

To further increase the coercive force of the second ferromagnetic metal layer 60, an antiferromagnetic material such as IrMn, PtMn, or the like may be brought into contact with the surface of the second ferromagnetic metal layer 60 opposite to the nonmagnetic layer 50. Further, the second ferromagnetic metal layer 60 may employ a synthetic ferromagnetic coupling structure to prevent the leakage magnetic field of the second ferromagnetic metal layer 60 from affecting the ferromagnetic metal layer 10.

The wiring layer 70 is not particularly limited as long as it has conductivity. For example, copper, aluminum, or the like can be used for the wiring layer 70.

[Second Embodiment]

Figure 8:
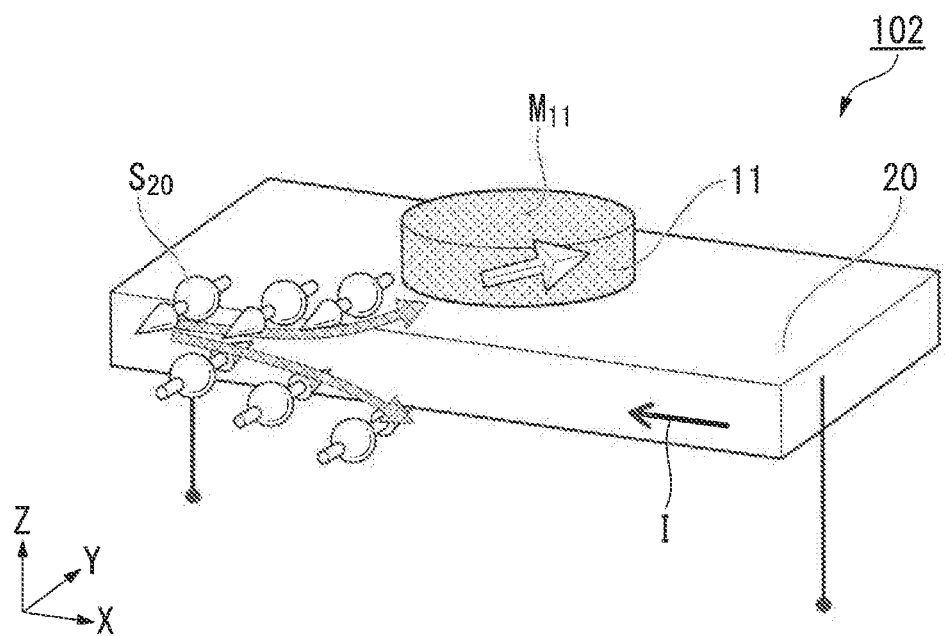
FIG. 8 is a perspective view schematically showing a random number generator according to a second embodiment.

FIG. 8 is a perspective view schematically showing a random number generator 102 according to a second embodiment. The random number generator 102 shown in FIG. 8 is different from the random number generator 100 according to the first embodiment in that the easy magnetization direction of the magnetization $M_{11}$ of the ferromagnetic metal layer 11 and the direction of spins $S_{20}$ injected from the spin-orbit torque wiring 20 into the ferromagnetic metal layer 11 intersect each other rather than being orthogonal to each other. In FIG. 8, the magnetization $M_{11}$ of the ferromagnetic metal layer 11 has an easy magnetization axis in a direction inclined at 45 degrees from each of the x and y axes of the xy plane.

In the random number generator 100 according to the first embodiment, the direction of spins $S_{20}$ injected from the spin-orbit torque wiring 20 into the ferromagnetic metal layer 10 and the easy magnetization direction of the ferromagnetic metal layer 10 are orthogonal to each other such that the probabilities of occurrence of "1" and "0" are equivalent to 50%.

However, if the random number generator generates a random number from a stochastic event occurring in nature, the probabilities of occurrence of "1" and "0" are not necessarily 50%. For example, even if the probability of occurrence of "1" is 70% and the probability of occurrence of "0" is 30%, it is a natural random number if one event occurs at a time stochastically.

The random number generator 102 according to the second embodiment is configured to adjust the angle formed between the easy magnetization direction of the magnetization of the ferromagnetic metal layer and the direction of spins injected from the spin-orbit torque wiring into the ferromagnetic metal layer to change the probabilities of occurrence of "1" and "0".

The easy magnetization direction of the ferromagnetic metal layer 11 can be controlled by the type of the material constituting the ferromagnetic metal layer 11, the shape of the ferromagnetic metal layer 11, or the like. For example, when the ferromagnetic metal layer 11 has a shape anisotropy, the major axis direction of the ferromagnetic metal layer 11 becomes the easy magnetization direction.

Also in the random number generator 102 shown in FIG. 8, when a current is applied to the spin-orbit torque wiring 20, the magnetization $M_{11}$ of the ferromagnetic metal layer 11 is oriented in the −y direction under the influence of spins $S_{20}$ supplied from the spin-orbit torque wiring 20. When the current applied to the spin-orbit torque wiring 20 is stopped, the force causing the magnetization $M_{11}$ of the ferromagnetic metal layer 11 to be oriented in the −y direction is removed and the magnetization $M_{11}$ of the ferromagnetic metal layer 11 returns to the easy magnetization direction.

The ferromagnetic metal layer 11 has two easy magnetization directions, i.e., a first direction inclined at 45 degrees from the +x axis to the +y direction and a second direction inclined at 45 degrees from the −x axis to the −y direction. The magnetization $M_{11}$ of the ferromagnetic metal layer 11 when a current is supplied to the spin-orbit torque wiring 20 is in the −y direction. Therefore, when the magnetization $M_{11}$ is oriented in the first direction, the magnetization $M_{11}$ needs to be rotated by 135 degrees. On the other hand, when the magnetization $M_{11}$ is oriented in the second direction, the magnetization only needs to be rotated by 45 degrees. That is, the magnetization $M_{11}$ is more likely to be oriented in the second direction than in the first direction.

However, the behavior of the magnetization $M_{11}$ is still stochastic. Therefore, although the magnetization $M_{11}$ is likely to be oriented in the second direction, the magnetization $M_{11}$ is not always oriented in the second direction but may be oriented in the first direction. In this case, when the probability of orientation of the magnetization $M_{11}$ in the first direction is A and the probability of orientation in the second direction is B, A<B.

In this manner, it is possible to adjust the probabilities of occurrence of the random number generator by adjusting the angle formed between the easy magnetization direction of the magnetization $M_{11}$ of the ferromagnetic metal layer 11 and the direction of spins $S_{20}$ injected from the spin-orbit torque wiring 20 into the ferromagnetic metal layer 11.

It is preferable that the angle formed between the easy magnetization direction of the magnetization $M_{11}$ of the ferromagnetic metal layer 11 and the direction of spins $S_{20}$ injected from the spin-orbit torque wiring 20 into the ferromagnetic metal layer 11 is 45 degrees or more and 90 degrees or less. As the angle formed between the easy magnetization direction of the magnetization $M_{11}$ of the ferromagnetic metal layer 11 and the direction of spins $S_{20}$ injected from the spin-orbit torque wiring 20 into the ferromagnetic metal layer 11 is smaller than 45 degrees, the behavior approaches that of the random number generator 30 using STT and it becomes necessary to adjust the amount of current applied.

[Third Embodiment]

Figure 9:
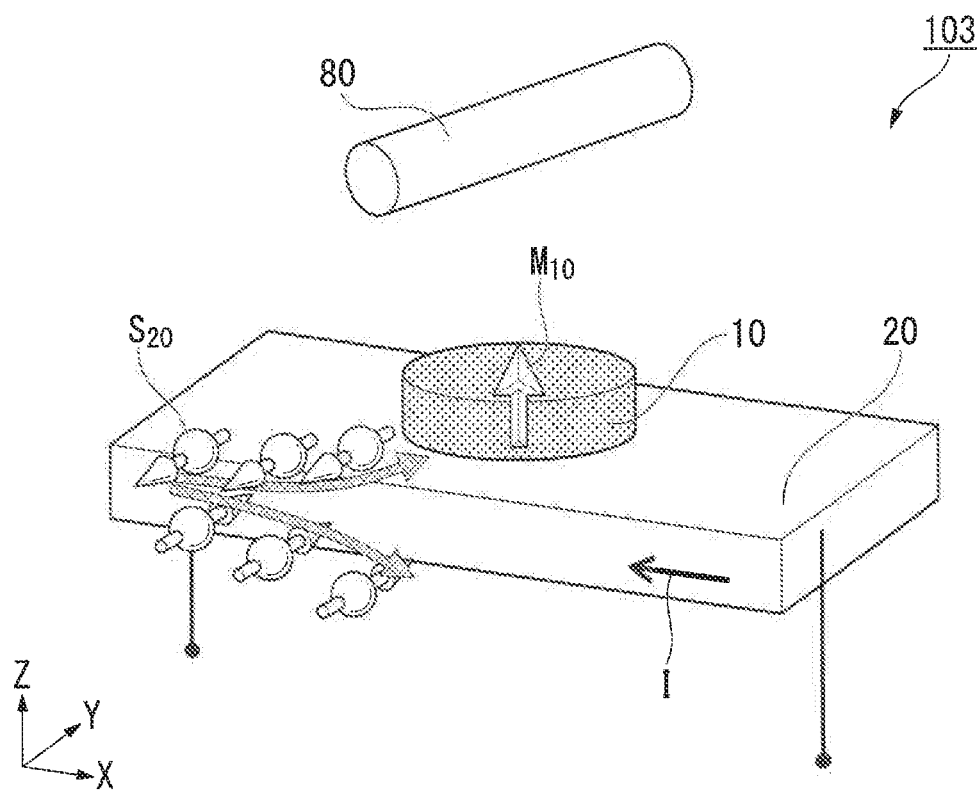
FIG. 9 is a perspective view schematically showing a random number generator according to a third embodiment.

FIG. 9 is a perspective view schematically showing a random number generator 103 according to a third embodiment. The random number generator 103 shown in FIG. 9 is different from the random number generator 100 according to the first embodiment in that an external magnetic field applying part 80 which applies a magnetic field to the ferromagnetic metal layer 10 is provided. In FIG. 9, a wiring is provided above the ferromagnetic metal layer 10 as the external magnetic field applying part 80. A magnetic field centered on the wiring is generated by causing a current to flow through the wiring.

By providing the external magnetic field applying part 80, it is possible to adjust the probabilities of occurrence of "1" and "0" of the random number generator. For example, when the probabilities of occurrence deviate from 50% under the influence of heat or the like, it is possible to adjust the probabilities of occurrence to 50% using the external magnetic field applying part 80. The external magnetic field applying part 80 can also be used to deviate the probabilities of occurrence from 50%.

In this manner, the probabilities of occurrence of "1" and "0" of the random number generator can be adjusted using an external magnetic field. In other words, it can be said that there is a possibility that the random number generator is influenced by magnetic fields generated from peripheral circuits. Therefore, a magnetic shield surrounding the ferromagnetic metal layer and the spin-orbit torque wiring may be provided to suppress the influence of magnetic fields from peripheral circuits.

Figure 10:
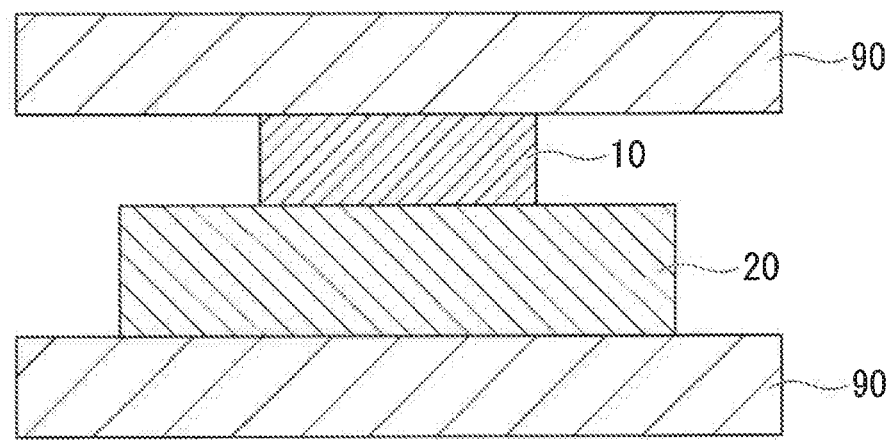
FIG. 10 is a cross-sectional view schematically showing a random number generator provided with a magnetic shield.
Figure 11:
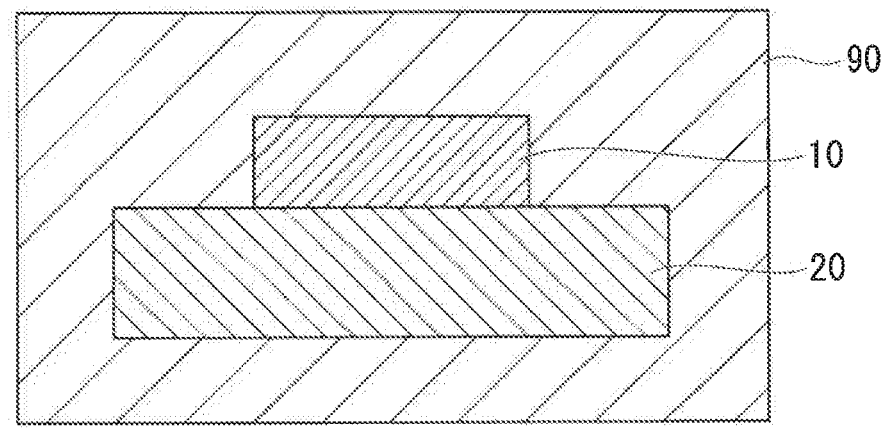
FIG. 11 is a cross-sectional view schematically showing another example of a random number generator provided with a magnetic shield.

FIGS. 10 and 11 are schematic views of a random number generator provided with a magnetic shield. In FIG. 10, a magnetic shield 90 is provided such that it sandwiches the ferromagnetic metal layer 10 and the spin-orbit torque wiring 20 therebetween. In FIG. 11, a magnetic shield 90 is provided such that it surrounds the ferromagnetic metal layer 10 and the spin-orbit torque wiring 20. The magnetic shield 90 is insulated from each of the ferromagnetic metal layer 10 and the spin-orbit torque wiring 20 (not shown). A high permeability magnetic material such as NiFe or the like can be used for the magnetic shield 90.

[Fourth Embodiment]

FIG. 12 is a perspective view schematically showing a random number generator 104 according to a fourth embodiment. The random number generator 104 shown in FIG. 10 is different from the random number generator 100 according to the first embodiment in that a plurality of ferromagnetic metal layers 10 are joined to the spin-orbit torque wiring 20.

Each of the plurality of ferromagnetic metal layers 10 generates a random number. Therefore, by averaging these random numbers, it is possible to increase the accuracy of a random number generated by the random number generator.

The random number generator according to the above embodiments can generate natural random numbers. Further, in the random number generator according to the above embodiments, the direction in which the magnetization is desired to be oriented when current is applied and the direction of the force applied to the magnetization coincide with each other. Therefore, it is unnecessary to adjust the amount of current supplied or the like and the stability of the random number generator is high. Further, the spin-orbit torque wiring 20 of the random number generator may be connected to a semiconductor circuit such as a transistor or the like and may be used as a semiconductor integrated device.

The random number generator according to the above embodiments can be used as an analog signal generator in a neuromorphic computer, a quantum computer, or the like. Specifically, for example, the random number generator according to the above embodiments can be applied to a neuromorphic computer which includes both a product-sum operation circuit in which random number generators are arranged in an array and an element for weighting input signals and simulates the brain.

(Method of Manufacturing Random Number Generator)

The random number generator described above can be produced using known film forming means such as sputtering and processing techniques such as photolithography. A metal or the like constituting each layer is laminated in order on a substrate which is a supporting body and then processed into a predetermined shape.

Examples of the film forming method that can be used other than sputtering include a vapor deposition method, a laser ablation method, and an MBE method. In the photolithography method, a resist film is formed in portions to be left and unnecessary portions are removed by a process such as ion milling or reactive ion etching (RIE).

When a TMR element with a nonmagnetic layer being an insulator is produced as a means for reading information, for example, first, a metal thin film of about 0.4 to 2.0 nm may be sputtered on a ferromagnetic metal layer and natural oxidation may be performed through plasma oxidation or oxygen introduction, and subsequent heat treatment may be performed to form a tunnel barrier layer.

The present invention is not necessarily limited to the above embodiments and various modifications can be made without departing from the spirit of the present invention.

EXAMPLES

Example 1

In Example 1, a random number generator having the same arrangement as in FIG. 7 was produced. Ta was used for the spin-orbit torque wiring 20 and FeB was used for the ferromagnetic metal layer 10. The thickness of the ferromagnetic metal layer 10 was 1 nm and the direction of orientation of the magnetization $M_{10}$ of the ferromagnetic metal layer 10 was the z direction. The saturation magnetization $M_S$ of the ferromagnetic metal layer 10 was 1200 emu/cm$^3$, the effective anisotropic magnetic field $H_{K,eff}$ of the ferromagnetic metal layer 10 was 5 KOe, and the effective spin Hall angle $\theta_{SH}$ of the spin-orbit torque wiring was 0.07. No external magnetic field was applied. MgO was used for the nonmagnetic layer 50 and CoFeB was used for the second ferromagnetic metal layer 60.

Then, a current of 5.0×10$^7$ A/cm$^2$ was applied to the spin-orbit torque wiring 20 of the random number generator. This amount of current was greater than the current density Jc (4.3×10$^7$ A/cm$^2$) obtained from the right side of the relational expression (1).

The random number generator was operated 10000 times to calculate the probabilities that the magnetization of the ferromagnetic metal layer 10 and the magnetization of the second ferromagnetic metal layer 60 were parallel and antiparallel. As a result, it was confirmed that the random number generator stochastically generated parallel and antiparallel magnetizations with the probabilities of occurrence of each being was 50%.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES 10, 11 Ferromagnetic metal layer
20 Spin-orbit torque wiring
20A Spin generating portion
20B Low resistance portion
20C Spin conducting portion
30 Random number generator using STT
31 Free layer
32 Nonmagnetic layer
33 Fixed layer
34 Wiring
50 Nonmagnetic layer
60 Second ferromagnetic metal layer
70 Wiring layer
80 External magnetic field applying part
$M_{10}$, $M_{11}$, $M_{31}$, $M_{33}$, $M_{60}$ Magnetization
$S_{20}$ Spin
100, 101, 102, 103, 104 Random number generator

What is claimed is:

1. A random number generator comprising:
a ferromagnetic metal layer; and
a spin-orbit torque wiring extending in a first direction intersecting a lamination direction of the ferromagnetic metal layer and being joined to the ferromagnetic metal layer,
wherein a direction of spin injected from the spin-orbit torque wiring into the ferromagnetic metal layer and an easy magnetization direction of the ferromagnetic metal layer intersect each other, and
wherein a current applied to the spin-orbit torque wiring satisfies a relational expression (1), $$J \geq \frac{M_S t_F}{\theta_{SH}} \left( \frac{H_{K,eff}}{2} - \frac{H_x}{\sqrt{2}} \right) \times 10^7 \quad (1)$$

in the relational expression (1), $M_S$ is a saturation magnetization (emu/cm$^3$) of the ferromagnetic metal layer, $t_F$ is a film thickness (cm) of the ferromagnetic metal layer, $\theta_{SH}$ is an effective spin Hall angle of the spin-orbit torque wiring, $H_{K,eff}$ is an effective anisotropic magnetic field (Oe) of the ferromagnetic metal layer, and $H_x$ is an external magnetic field (Oe) applied in a current application direction of the spin-orbit torque wiring.

2. The random number generator according to claim 1, wherein the direction of the spin injected from the spin-orbit torque wiring into the ferromagnetic metal layer and the easy magnetization direction of the ferromagnetic metal layer are inclined at 45 degrees or more and 90 degrees or less with respect to each other.

3. The random number generator according to claim 1, wherein the direction of the spin injected from the spin-orbit torque wiring into the ferromagnetic metal layer and the easy magnetization direction of the ferromagnetic metal layer are orthogonal to each other.

4. The random number generator according to claim 2, wherein the direction of the spin injected from the spin-orbit torque wiring into the ferromagnetic metal layer and the easy magnetization direction of the ferromagnetic metal layer are orthogonal to each other.

5. The random number generator according to claim 1, wherein a plurality of the ferromagnetic metal layers are joined to the spin-orbit torque wiring.

6. The random number generator according to claim 2, wherein a plurality of the ferromagnetic metal layers are joined to the spin-orbit torque wiring.

7. The random number generator according to claim 3, wherein a plurality of the ferromagnetic metal layers are joined to the spin-orbit torque wiring.

8. The random number generator according to claim 4, wherein a plurality of the ferromagnetic metal layers are joined to the spin-orbit torque wiring.

9. The random number generator according to claim 1, wherein a nonmagnetic layer and a second ferromagnetic metal layer are provided in order on a surface of the ferromagnetic metal layer opposite to the spin-orbit torque wiring.

10. The random number generator according to claim 2, wherein a nonmagnetic layer and a second ferromagnetic metal layer are provided in order on a surface of the ferromagnetic metal layer opposite to the spin-orbit torque wiring.

11. The random number generator according to claim 3, wherein a nonmagnetic layer and a second ferromagnetic metal layer are provided in order on a surface of the ferromagnetic metal layer opposite to the spin-orbit torque wiring.

12. The random number generator according to claim 4, wherein a nonmagnetic layer and a second ferromagnetic metal layer are provided in order on a surface of the ferromagnetic metal layer opposite to the spin-orbit torque wiring.

13. The random number generator according to claim 5, wherein a nonmagnetic layer and a second ferromagnetic metal layer are provided in order on a surface of the ferromagnetic metal layer opposite to the spin-orbit torque wiring.

14. The random number generator according to claim 6, wherein a nonmagnetic layer and a second ferromagnetic metal layer are provided in order on a surface of the ferromagnetic metal layer opposite to the spin-orbit torque wiring.

15. The random number generator according to claim 7, wherein a nonmagnetic layer and a second ferromagnetic metal layer are provided in order on a surface of the ferromagnetic metal layer opposite to the spin-orbit torque wiring.

16. The random number generator according to claim 8, wherein a nonmagnetic layer and a second ferromagnetic metal layer are provided in order on a surface of the ferromagnetic metal layer opposite to the spin-orbit torque wiring.

17. The random number generator according to claim 1, further comprising an external magnetic field applying part configured to apply a magnetic field to the ferromagnetic metal layer.

18. The random number generator according to claim 1, further comprising a magnetic shield sandwiching or surrounding the ferromagnetic metal layer and the spin-orbit torque wiring.

19. A random number generation device comprising:
the random number generator according to claim 1; and
a current applying part configured to apply a current to the spin-orbit torque wiring of the random number generator.

20. A neuromorphic computer including the random number generator according to claim 1.

21. A quantum computer including the random number generator according to claim 1.

* * * * *